C. P. McMULLEN.
ELASTIC OR CUSHIONED WHEEL.
APPLICATION FILED MAR. 22, 1913.
1,127,790.
Patented Feb. 9, 1915.
2 SHEETS—SHEET 1.
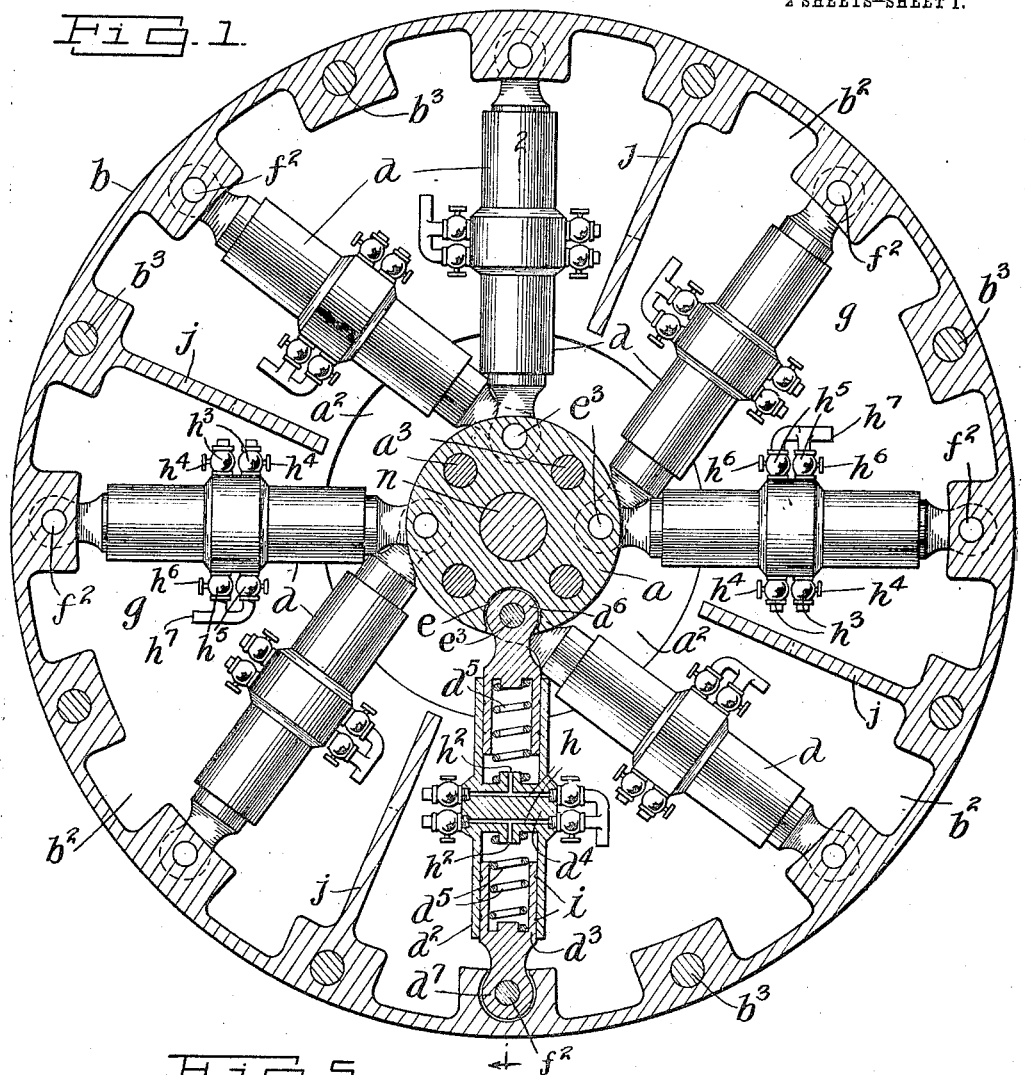
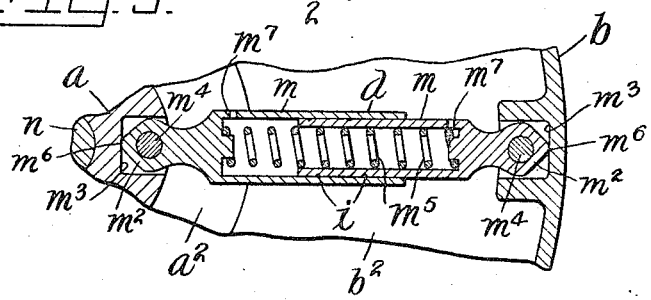
Witnesses:
H. E. Thompson
S. Andrews
Charles P. McMullen, Inventor
By his Attorneys Edgar Tate & Co.

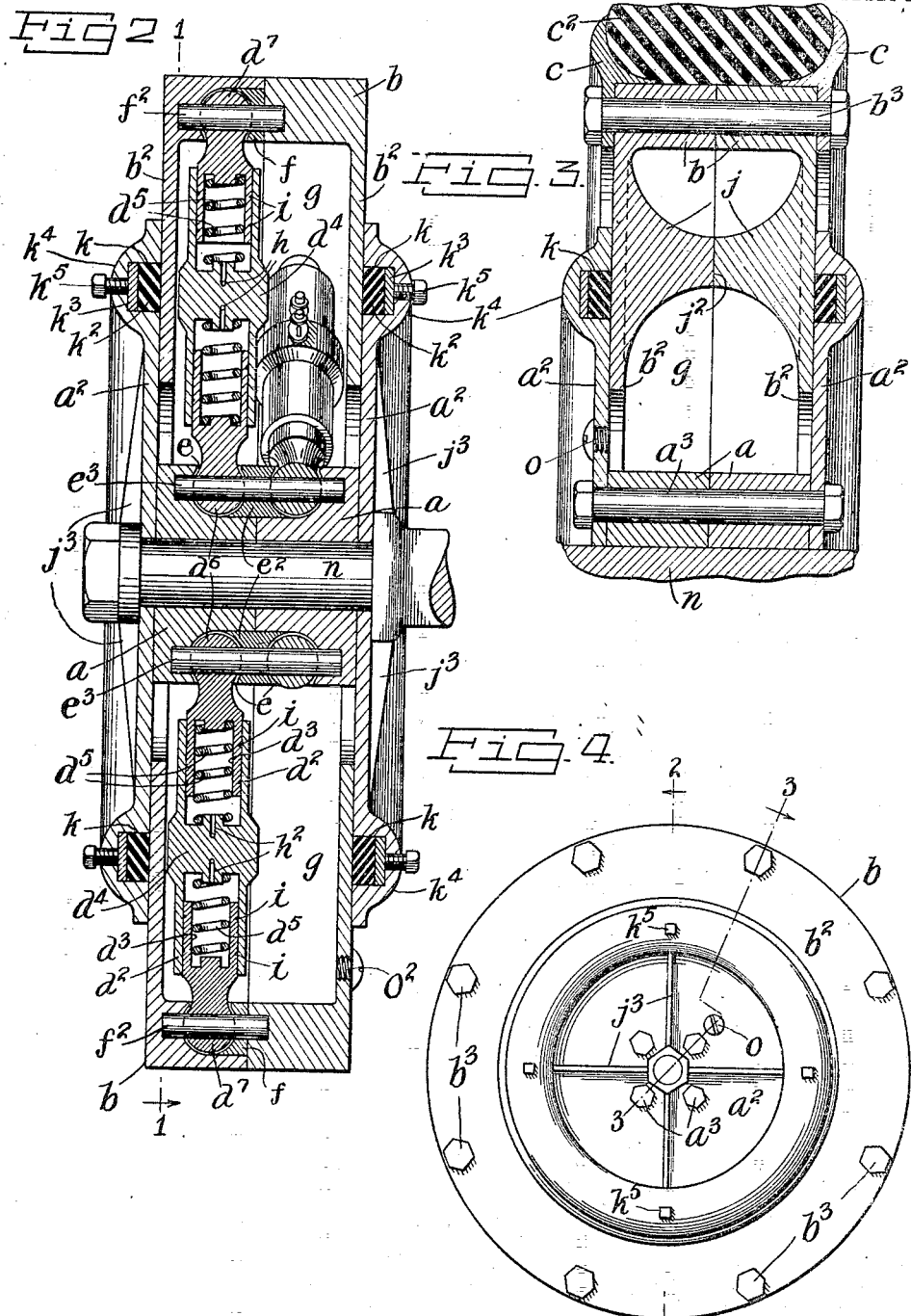

UNITED STATES PATENT OFFICE.

CHARLES P. McMULLEN, OF LYNDHURST, NEW JERSEY, ASSIGNOR OF ONE-FOURTH TO GEORGE S. HELMKEN, OF RICHMOND HILL, NEW YORK.

ELASTIC OR CUSHIONED WHEEL.

1,127,790.  Specification of Letters Patent.  Patented Feb. 9, 1915.

Application filed March 22, 1913. Serial No. 756,102.

*To all whom it may concern:*

Be it known that I, CHARLES P. Mc-MULLEN, a citizen of the United States, and residing at Lyndhurst, in the county of Bergen and State of New Jersey, have invented certain new and useful Improvements in Elastic or Cushioned Wheels, of which the following is a specification, such as will enable those skilled in the art to which it appertains to make and use the same.

This invention relates to elastic or cushioned wheels for automobiles and other vehicles, and the object thereof is to provide a wheel of this class which will operate in the manner of, or possess all the qualities of, a wheel with a cushioned or an inflated tire, but which will do away with the use of a cushioned or an inflated tire and which will be strong and durable and which may be used in connection with any kind or class of vehicles, and whenever wheels of the class specified are desired.

The invention is fully disclosed in the following specification of which the accompanying drawings form a part in which the separate parts of my invention are designated by suitable reference characters in each of the views, and in which;—

Figure 1 is a section of my improved wheel taken on the line 1—1 of Fig. 2, with one of the spokes also in section;—Fig. 2 a section on the lines 2—2 of Fig. 1 and Fig. 4;—Fig. 3 a section on the line 3—3 of Fig. 4;—Fig. 4 a side view of the wheel and on a reduced scale, and;—Fig. 5 a sectional detail view showing a modified form of spoke.

In the practice of my invention, as shown in the drawing, I provide a hub $a$ having circular side plates $a^2$ which are secured to the hub, in the construction shown, by bolts $a^3$, and I also provide a rim $b$ provided with annular inwardly directed side plates $b^2$ which are between the plates $a^2$ of the hub and are movable radially in the annular box-shaped casing formed by said plates $a^2$. The rim $b$ is also composed of two parts secured together by bolts $b^3$ which also serve, in the construction shown, for securing the annular clamp plates $c$ to the rim of the wheel, and by which a tire $c^2$ of any kind or class may be secured to said rim.

My improved wheel also involves cushioned or radial elastic spokes $d$, the preferred form of which is shown in Figs. 1 and 2 in detail. These spokes, as shown in said figures, consist of central sleeves $d^2$ and end members $d^3$ also made in the form of tubes or sleeves and movable radially in the central sleeves $d^2$, and the sleeves $d^2$ are divided by, or provided centrally with transverse portions $d^4$, and placed in the end members $d^3$ of the spokes are spiral springs $d^5$ which bear on the central parts $d^4$ of the sleeves $d^2$ and on the closed end portions of the parts $d^3$ of the spokes.

The inner end members $d^3$ of the spokes are provided with heads $d^6$ which fit in corresponding sockets in the hub $a$, and the outer end members $d^3$ of the spokes are provided with heads $d^7$ which fit in corresponding sockets in the rim $b$ of the wheel.

It will be observed that the spokes $d$ are arranged in two separate series occupying different parallel planes passing transversely through the hub and rim, or the separate parts thereof, and the spokes of one series are connected in direct radial lines with the hub and rim while the spokes of the other series are connected tangentially with the hub and at an angle to a radial line with the rim, and the object of this method of connecting the spokes with the hub and rim is to permit of the free cushioned action of the rim and at the same time, prevent said rim from turning in either direction and to any extent independently of the hub. It will also be observed that the spokes of the separate series hereinbefore referred to are arranged in pairs, in the construction shown, one of the radially arranged spokes and one of the spokes that are connected with the hub tangentially thereof being connected with the hub at the same point, and the hub or the separate parts thereof are provided with transverse recesses $e$ divided by inserted blocks $e^2$, and the inner heads $d^6$ of the spokes fit in the end portions of these recesses and are held in place by transverse pins $e^3$ passed centrally through said heads and through said recesses, one of said pins serving to hold the inner heads of one spoke of each series in position, and the said heads of the spokes and the said recesses, in the construction shown in Figs. 1 and 2, form what is known as a ball and socket joint.

The outer end portions of the separate series of spokes are connected with the rim or the separate parts thereof alternately, and the recesses in which the heads $d^7$ of the outer end portions of the spokes fit are formed as shown in Fig. 2, and open through the inner faces of the separate parts of the rim and are closed by plugs $f$ and this connection, or these connections, are also what are known as ball and socket joints, the outer end portions of the spokes being secured in position by pins $f^2$ passed through the heads $d^7$ thereof.

In practice, or in the use of my improved wheel, the annular chamber $g$ formed by the hub, the rim and the plates $a^2$ and $b^2$, will be filled or partially filled with oil or a suitable liquid lubricant, and the spokes and all the parts thereof including their connections, with the hub and with the rim of the wheel, will be thoroughly lubricated at all times and, in practice, I preferably provide the central parts $d^4$ of the sleeves $d^2$ of the spokes with transverse passages $h$, two of which are preferably employed and each of which is provided with a radial passage $h^2$ communicating with the opposite end portions of the spokes or the chambers therein in which the springs $d^5$ are placed. The passages $h$ are provided at one end, in the form of construction shown, with outlet spigots $h^3$ having discharge valves $h^4$, and at the other end with inlet spigots $h^5$ having suction valves $h^6$, and the inlet spigots $h^5$ are provided with an inlet pipe $h^7$ and by means of this construction, in the use or operation of the wheel, the radial movement of the rim with reference to the hub will cause a pump like action in the opposite end portions of the spokes and the lubricating material will be constantly brought into and forced out of said end portions of the spokes, and this material forms in the spoke members a hydraulic cushion which aids the spring cushions in said spoke members. My invention, however, is not limited to the particular means for permitting the passage of lubricating material into and from the opposite ends of the spokes, in the construction shown in Figs. 1 and 2, and any suitable construction may be provided for this purpose. I also preferably provide the portions of the spokes with annular grooves $i$ in which the lubricating material collects and forms a seal, but this construction also is not essential and may or may not be employed.

The plates $b^2$ are connected with and in effect form a part of the rim of the wheel and are provided at regular intervals with radially arranged, inwardly directed web members $j$ which abut at $j^2$, as shown in Fig. 3, and which serve as inner braces for said plates $b^2$, and the plates $a^2$ are provided with radial ribs $j^3$ which brace and strengthen said plates. The plates $a^2$ are also provided in their inner faces and near their outer edges with annular grooves $k$ in which are placed packing rings $k^2$ which bear on the plates $b^2$ and annular metal gaskets $k^3$ which bear on said packing rings, and said plates are provided outwardly of the grooves $k$ with thickened annular beads $k^4$ which strengthen said plates and through which are passed set screws $k^5$ which bear on the gaskets $k^3$ and force the packing rings $k^2$ into contact with the plates $b^2$, and the object of this construction is to prevent the lubricating material from passing out between the plates $a^2$ and $b^2$.

In Fig. 5, I have shown a modified form of spoke and a slightly modified form of the hub and rim of the wheel, a part of the hub being shown at $a$ and a part of the rim at $b$. In this form of construction, the spoke $d$ is composed of two parts only, said parts comprising telescopic sleeve members $m$ provided at their inner and outer ends with angular heads $m^2$ which fit in angular recesses $m^3$ in the hub and rim, and passed through the heads $m^2$ are pins $m^4$ which correspond with the pins $e^3$ and $f^2$, in the construction shown in Figs. 1 and 2, and placed in the telescopic sleeve members $m$ is a spiral spring $m^5$. With this form of construction, the heads $m^2$ are provided with nose members $m^6$ which contact with one of the side faces of the angular recesses respectively on the hub and rim and form locking means for the spokes when the wheel is turned toward the right or reversed, and this construction may be such that the pins $m^4$ will simply serve to hold the spoke in position while the weight of the vehicle or the load will be thrown directly on the heads $m^2$ of the spokes or the separate parts thereof.

The telescopic members $m$ may also be provided with ports or passages $m^7$ to permit the inflow and outflow of oil or other lubricating material, and in the operation of a wheel made in this manner, the parts of the spokes would operate as a pump to draw the lubricating material into, and force it out of said parts.

With my improvement, the vehicle and load will be cushioned and resiliently supported at all times, the rim of the wheel or wheels being freely movable radially toward and from the hub or hubs thereof, and the load being borne by the springs placed in the spokes.

My invention is not limited to the use of the springs in the spokes, and said spokes may be cushioned in other ways, as, for instance, by providing means for the admission thereinto and discharge therefrom in the radial movement of the separate parts thereof of air and lubricating material, in which event any suitable inlets and outlets into and from the spokes or the separate parts thereof for the air or other material may be employed.

In the construction shown, only four spokes of each series are employed, but it will be understood that any desired number of spokes may be used.

Any suitable means may be provided for filling or partially filling the chamber $g$ with lubricating material and for cleaning said chamber and discharging the contents thereof, and for this purpose an aperture $o$ may be formed in one of the plates $a^2$ and may be provided with a suitable plug or closure device and through which the lubricating material may be passed into said chamber, and a similar aperture $o^2$ may be formed in one of the plates $b^2$ through which the contents of said chamber may be conveniently discharged, and the aperture $o^2$ may be provided with any desired form of plug or closure device.

In Figs. 1 and 2 of the accompanying drawings, I have shown my improved wheel loosely mounted on the spindle $n$ of a vehicle, but it will be understood that wheels made in this manner may be rigidly secured to the spindle of the rear axles of automobiles or similar vehicles or to the driving axles of said vehicles, or they may be mounted in any manner and used in connection with any kind or class of vehicles.

The chief object of the arrangement of one series of the spokes $b$ tangentially to the hub, is to prevent the rotary movement of the rim with relation to the hub independent of the hub, and it must be borne in mind that my invention is not limited to this exact construction for the accomplishment of this result, and the spokes may be otherwise arranged and otherwise connected for the same purpose, the chief feature of my invention in this connection being the provision of telescopic and cushioned spokes connected with the hub and rim of the wheel in such manner as to prevent the rotary movement of the rim independent of the hub, and at the same time, permit of the radial movement of the rim with reference to the hub, or the radial movement of the hub with reference to the rim and to cushion said movement or movements, and various changes in and modifications of the construction herein described may be made within the scope of the appended claims, without departing from the spirit of my invention or sacrificing its advantages.

Having fully described my invention what I claim as new and desire to secure by Letters Patent is;—

1. A wheel comprising a hub, a rim and spokes, the spokes being composed of telescopic and cushioned members, and being pivotally connected with the rim and with the hub, and said spokes being also arranged in pairs, and the spokes of each pair being connected with the hub at the same point and longitudinally thereof, and by means of the same pivot pin, one spoke of each pair being tangential to the hub, and the other radial thereto, and locking means to prevent displacement of said spokes when the wheel is rotated in one direction.

2. A wheel comprising a hub, a rim and spokes, the spokes being composed of separate telescopic and cushioned members and being arranged in separate series and in different parallel planes which cross the hub at right angles thereto, the spokes of one series being pivotally connected radially with the hub and with the rim, and the spokes of the other series being connected tangentially with the hub at an angle to a radial line, the spokes of the separate series being also arranged in pairs, and the spokes of each pair being connected with the hub at the same point and by means of the same pivot pin, and locking means to prevent displacement of said spokes when the wheel is rotated in one direction.

3. A wheel composed of a hub, a rim and spokes, the hub and rim being composed of separate similar parts, and the spokes being arranged in separate series corresponding with the parts of the hub and rim, said spokes being pivotally connected with the hub and rim and being composed of telescopic and cushioned members, one series of said spokes being connected with the hub and rim in radial lines, and the other series in lines tangential to the hub, said spokes being also arranged in pairs and the spokes of each pair being connected with the hub at the same point and by means of the same pivot pin, and locking means to prevent displacement of said spokes when the wheel is rotated in one direction.

4. A wheel comprising a hub, a rim and spokes, the hub and rim being provided with overlapping side plates which entirely inclose the spokes and form a closed annular chamber around the hub, one set of said plates being movable radially toward and from the hub and on the other set, and one set of said plates being also provided with annular packings, said spokes being loosely connected with the hub and rim and being composed of telescopic and cushioned members consisting of three parts, a central part, a part connected with the hub, and a part connected with the rim, the central part being provided with a transverse member, and the parts connected with the hub and rim being each provided with spring cushions, and means whereby oil contained in said chamber will be forced into and out of the telescopic parts of the spokes connected with the hub and rim, in the operation of the wheel.

5. A wheel comprising a hub, a rim and spokes, the hub and rim being provided with overlapping side plates which entirely inclose the spokes and form a closed annular chamber around the hub, one set of said plates being movable radially toward and from the hub and on the other set, and one set of said plates being also provided with annular packings, said spokes being loosely connected with the hub and rim and being composed of telescopic and cushioned members consisting of three parts, a central part, a part connected with the hub, and a part connected with the rim, the central part being provided with a transverse member, and the parts connected with the hub and rim being each provided with spring cushions, and means whereby oil contained in said chamber will be forced into and out of the telescopic parts of the spokes connected with the hub and rim, in the operation of the wheel, consisting of passages formed in the central spoke members and communicating with the chambers in the hub and rim spoke members, and provided with suction and discharge valves.

6. A wheel comprising a hub, a rim and tubular telescopic spokes composed of separate parts, said spokes being loosely connected both with the hub and rim, and being provided with spring cushions, said rim being movable radially toward and from the hub, and said hub and rim being provided with overlapping side plates which form an annular chamber around the hub and which entirely inclose the spokes, said chamber being adapted to contain lubricating material, and said spokes being provided with ports or passages whereby in the operation of the wheel, lubricating material from said chamber will be forced into and out of said spokes, thus forming an additional hydraulic cushion therein.

7. A wheel comprising a hub, a rim and tubular telescopic spokes composed of separate parts, said spokes being loosely connected both with the hub and rim, and said hub and rim being provided with overlapping side plates which form an annular chamber around the hub, and which entirely inclose said spokes, said chamber being adapted to contain lubricating material, and said rim being movable toward and from the hub, said spokes being provided with spring cushions and being also provided with ports or passages whereby lubricating material in said chamber will be forced into and out of said spokes in the operation of the wheel, thus forming an additional hydraulic cushion therein, and said spokes being also composed of separate series, one series being connected with the hub and rim in radial lines, and the other series being connected with the hub tangentially thereof.

8. A wheel comprising a hub, a rim and spokes, the hub and rim being provided with overlapping side plates which entirely inclose the spokes and form a closed annular chamber around the hub adapted to receive a lubricating material, the rim being radially movable toward and from the hub, and the plates on the rim being provided with annular packings, said spokes being loosely connected with the hub and rim and being composed of telescopic and cushioned members, and said spokes being also provided with means whereby lubricating material contained in said annular chamber will flow freely thereinto and therefrom in the operation of the wheel.

9. A wheel comprising a hub, a rim and spokes, the spokes being composed of telescopic and cushioned members, and being pivotally connected with the rim and with the hub, and said spokes being also arranged in pairs, the spokes of each pair being connected with the hub at the same point longitudinally thereof, and by means of the same pivot pin, one spoke of each pair being tangential to the hub, and the other radial thereto, and beveled ends provided on said spokes adapted to coöperate with the hub and rim to prevent displacement of said spokes when the wheel is rotated in one direction.

In testimony that I claim the foregoing as my invention I have signed my name in presence of the subscribing witnesses this 20th day of March 1913.

CHARLES P. McMULLEN.

Witnesses:
S. ANDREWS,
C. MULREANY.